United States Patent [19]

Huang et al.

[11] Patent Number: 5,107,366
[45] Date of Patent: Apr. 21, 1992

[54] HIGH EFFICIENCY ELECTROMAGNETIC COIL APPARATUS AND METHOD

[75] Inventors: Yuchi Huang; Robert V. Burch, both of Madison, Wis.

[73] Assignee: Nicolet Instrument Corporation, Madison, Wis.

[21] Appl. No.: 414,178

[22] Filed: Sep. 28, 1989

[51] Int. Cl.⁵ .................. G02B 26/08; G01B 9/02; H02K 41/00
[52] U.S. Cl. .................. 359/223; 310/13; 356/346
[58] Field of Search .............. 350/484, 486, 631, 640; 310/13, 27, 38, 15, 17; 123/599; 354/234.1; 335/299; 336/208; 356/346, 345

[56] References Cited

U.S. PATENT DOCUMENTS

| | | | |
|---|---|---|---|
| 3,936,193 | 2/1976 | Auth | 356/346 |
| 4,158,756 | 6/1979 | Keezer | 179/115.5 |
| 4,247,794 | 1/1981 | Jooss et al. | 310/13 |
| 4,473,274 | 9/1984 | Yamo et al. | 350/6.3 |
| 4,693,603 | 9/1987 | Auth | 356/346 |
| 4,734,976 | 4/1988 | Matson | 29/606 |
| 4,965,864 | 10/1990 | Roth et al. | 310/17 |

OTHER PUBLICATIONS

King, John, "Loudspeaker Voice Coils", *Journal of the Audio Engineering Soc.*, vol. 18, No. 1, Feb. 1970, pp. 34-43, 1970.

Yamashita, F., "Self-Expandable Coil-Molding Compound and its Applications", *National Technical Report* (Japan), vol. 29, No. 1, pp. 11-16, Feb. 1983.

Colloms, M., High Performance Loudspeakers, Third Edition, Pentech Press, Ltd., Estover Road, Plymouth, Devon PL6 7PZ, England, pp. 133-141, 1985.

Primary Examiner—Bruce Y. Arnold
Assistant Examiner—James Phan
Attorney, Agent, or Firm—Foley & Lardner

[57] ABSTRACT

An electromagnetic coil is wound on a circular mold and potted with a potting compound in order to eliminate the bobbin which is used with prior art electromagnetic coils. The potting technique can be advantageously applied to coils wound on any shape mold and to coils wound with wire of any cross-sectional shape. In the preferred embodiment the "bobbinless" coil is wound on a cylindrical mold and uses wire which has been partially flattened to improve the density of the coil. The flattened wire is preferably made by flattening ordinary wire copper to an aspect ratio of about 1.5. In an alternate embodiment, the bobbinless coil is wound with ordinary circular wire. In the preferred embodiment, the bobbinless coil forms part of a linear motor for use in driving the movable mirror in an interferometer spectrometer. In this application the coil provides a strong flux density and a strong force, yet occupies a relatively small volume.

14 Claims, 7 Drawing Sheets

HIGH EFFICIENCY ELECTROMAGNETIC COIL APPARATUS AND METHOD

FIELD OF THE INVENTION

The invention relates to magnetic coils used for providing electromagnetic fields and, in particular, to high efficiency magnetic coils used in making electric motors. The invention has particular utility in the making of linear motors for driving the movable mirror in an interferometer spectrometer.

BACKGROUND OF THE INVENTION

Electromagnetic coils are well known to prior art. A coil winding form, known as a bobbin or former, is created in the desired shape of the coil. The bobbin is wound with wire until a suitable number of turns are produced. The number of turns which are wound onto the bobbin is one factor which determines the ultimate strength of the electromagnetic field that the coil can produce, the strength being approximately proportional to the product of the number of turns of wire times the electrical current flowing in the wire, usually referred to as ampere-turns.

One difficulty with producing coils which have a high number of ampere-turns, and thus a high electromagnetic field strength, is that increasing the current, e.g. the amperage, flowing in the wire also increases the resistive (Joule or Ohm) heating of the coil. This heating represents lost energy in the coil and is a significant component of low efficiency.

An alternative to increasing the current is increasing the number of turns of wire on the bobbin. While this may seem to be an attractive solution, the larger coil takes up more space inside the device in which the coil is mounted. This hampers efforts to keep the device small. One way to combat this problem is by flattening the wire so that it has a square or rectangular cross-section. Such wire, sometimes referred to as ribbon wire, packs more densely than circular wire when it is wrapped onto the bobbin. Unfortunately, when circular wire is flattened in this manner, the resistance of the wire tends to increase due to cold working of the metal. This higher resistance in the wire increases the resistive heating of the coil and lowers its efficiency. As an alternative to flattening ordinary wire, spools of preformed square or rectangular wire can be obtained from wire manufacturers. Preformed wire, since it is square or rectangular to begin with, can be treated (i.e. annealed) at the factory to exhibit less cold working. However, preformed wire has the disadvantage of being more difficult to handle than ordinary circular wire. Preformed wire tends to twist as it is being wound from the spool onto the bobbin, which can lead to uneven coil windings. This twisting can be difficult to prevent, especially for thinner wire whose flat sides may be too small to serve as good guides for controlling the twist.

Another component which influences efficiency is the bobbin around which the coil is wound. Since the bobbin takes up space, it prevents the coil from coming into close proximity to whatever object, i.e. armature, permanent magnet, solenoid shaft, etc., the coil is trying to act against. Since the electromagnetic force produced by the coil on an object is inversely related to the interstitial distance between the coil and the object, increasing the distance reduces the ultimate available force. Thus, achieving a given force over a larger distance requires more ampere-turns than would achieving the same force over a shorter distance. But is mentioned above, increasing the number of ampere-turns may have undesirable consequences.

In connection with interferometer spectrometers, electromagnetic coils are used in linear motors for producing high-accuracy linear translation of the movable mirror of such inferometers. The coil is typically attached to a support element of the movable mirror, and permanent magnets are attached to the interferometer housing in close proximity to the coil. Applying a time varying electrical signal to the coil, such as a ramp function, allows smooth and accurate linear translation of the movable mirror. This arrangement is known to provide extremely good linear translation of the movable mirror, which is important to the successful operation of the interferometer. An example of such an arrangement is shown in U.S. Pat. No. 4,693,603, issued Sept. 15, 1987 to Auth, which is incorporated herein by reference.

With respect to linear motors for use in interferometers, it has been observed that, in certain instances of large mirror displacement, the bobbin tends to collide with the sides of the bore in which the bobbin moves. One reason for this is that the moving mirror assembly, including the bobbin, is commonly mounted on a parallelogram support system which provides longitudinal translation of the moving mirror by swinging the mirror back and forth in an arc. With an accurate parallelogram support system, the mirror can be translated through a relatively large longitudinal range of motion without significantly disturbing its alignment. Of course, as it swings back and forth in an arc, the mirror support assembly also moves up and down, producing a lateral displacement of the bobbin within the bore. As the mirror swings through larger longitudinal strokes, which it may do in order to obtain increased spectral resolution from the interferometer, the lateral displacement of the bobbin also gets larger, until eventually the bobbin collides with the sides of the bore. The collisions can sometimes cause the bobbin to jam in the bore, and can occasionally damage the interferometer.

One way to reduce the chance of the bobbin colliding with the bore is mentioned in the above referenced U.S. Patent. By making the lateral cross-section of the bobbin and the bore rectangular, the sides of the bobbin and the bore can be made parallel to each other and orthogonal to the axis of the swinging mirror support, so that the distance between the bobbin and bore does not change much as the bobbin moves back and forth in its stroke. The bobbin is therefore less prone to colliding with the sides of the bore.

However, it has also been observed that when a coil is wound on a rectangular bobbin, the electromagnetic field produced by the coil may not be uniform. In particular, when it is used to drive the moving mirror in an interferometer, the mirror often exhibits some nonlinearities in its back and forth travel. Although this phenomenon is not well understood, it is believed to be due in part to fringing effects which occur in the magnetic field lines at the corners of the coil. Circular coils, being symmetrical, do not have this problem.

An additional problem with the rectangular bobbins is that they are more difficult to wind than are circular ones. With rectangular bobbins the tension of the wire changes as the different corners and faces of the bobbin are encountered, making it more difficult to keep the windings uniform. Another problem is that the windings are often bent very severely around the corners of the bobbin, which can cause the wire to work-harden, or even break, at those points. Work-hardening is undesirable because it increases the electrical resistance of the wire, which increases its heat dissipation and reduces its efficiency. Circular bobbins, again, do not encounter these problems.

Another disadvantage of rectangular bobbins is that rectangular coils tend to be less efficient than circular coils. When used in the manner suggested by the above U.S. Patent, the only portion of the coils that does any work in the portion that is parallel to the permanent magnets in the bore. The portion of the coils which is orthogonal to the permanent magnets does not do any work, so the current which flows through this portion of the coils is wasted. One solution to this problem is to increase the aspect ratio (the ratio of the long side to the short side) of the bobbin so that most of the winding is parallel to the magnets. Then, only a small portion of the current is wasted. Unfortunately, increasing the aspect ratio makes the windings even more difficult to produce, because of the severe changes in tension, and also more likely to have work hardening or wire breakage at the corners. Again, a circular coil would avoid these problems because the permanent magnets could be positioned all around its periphery.

SUMMARY OF THE INVENTION

In accordance with the present invention a coil is formed which has no bobbin. Instead of using a bobbin, the coil is formed around a mold or mandrel and then is potted with a potting compound, such as a curable liquid adhesive, resin, or epoxy, so that the coil can be removed from the mold after the potting compound has hardened. Since the coil is supported by the potting compound, no bobbin is needed in the final coil. Because the potting compound occupies considerably less space than the bobbin, the windings of the bobbinless coil can be located closer to the permanent magnets of the motor without decreasing the spatial gap between them. This creates a higher magnetic flux density between the coil and magnets than would otherwise be possible if a bobbin were used.

To further improve efficiency, the bobbinless coil is formed with wire that has been flattened to an approximately rectangular or semi-rectangular (meaning that the corners may be rounded) cross-section. The flattened wire allows the windings in the coil to be packed much closer together than is possible with ordinary circular wire. This closer packing allows more wire to be wound into a given space, thereby allowing a greater number of ampere-turns in a coil of a given size. This increases the magnetic field strength of the coil, for a given size and current, and results in an improved coil design. Among other advantages, the higher magnetic field strength allows a larger gap to be used between the coil and the permanent magnets in a linear motor without reducing the magnitude of the forces generated between them. When applied to the linear motor in an interferometer spectrometer, having a larger gap allows a circular coil to be used without increasing the likelihood that it will jam or interfere with the bore as it moves laterally in its stroke.

The flattened wire is produced by flattening ordinary round copper wire to an aspect ratio of about 1.5. The flattened wire has about the same width as the diameter of the original wire, but the height is about 30 percent less than the original wire diameter. The flattening action only pushes a small portion of the material around the top and bottom of the wire, over to the two sides to make up the four corners of the flattened wire. When the wire is flattened to much more than about a 1.5 aspect ratio, two undesirable things happen; the increased width of the wire becomes much more noticeable without improving much on the packing efficiency of the wire; and excessive cold working of the wire is produced by the flattening process, resulting in increased resistivity of the wire, which results in more Ohm heating and less efficiency.

The flattening of the wire is preferably performed just before the coil is wound. This allows the device which flattens the wire to also serve as part of the tensioning mechanism and guide for the wire. This helps avoid the problem of wire twisting which might otherwise occur if the wire is flattened first without being wound onto the bobbin.

In addition to providing a means for getting the same amount of ampere-turns in a thinner, so smaller, space, the flattened wire also enhances winding uniformity and dimensional stability. This is because the contact regions between adjacent wires are surfaces, instead of lines or points as is the case with adjacent round wires. Uniformity and stability are important considerations for coils used in interferometer spectrometers due to the extreme accuracy which is needed in driving the movable mirror.

The present invention can be used in substantially any application, but is particularly well suited to use in interferometers.

Additional objects, features, and advantages of the invention will be apparent from the following detailed description when taken in conjunction with the accompanying drawings.

BRIEF DESCRIPTION OF THE DRAWINGS

FIG. 1b is an enlarged cross-sectional view of a few of the wires in the prior art coil of FIG. 1a.

FIG. 2b is an enlarged cross-sectional view of a few of the wires in the coil of FIG. 2a.

FIG. 3b is an enlarged cross-sectional view of a few of the wires in the bobbinless coil of FIG. 3a.

FIGS. 4a and 4b are cross-sectional views of an example mold which may be used for producing the bobbinless coil of FIG. 3a.

FIG. 8 is a cross-sectional view of the mold and cover of FIGS. 4a and 4b, as indicated by the arrow in FIG. 4a.

DETAILED DESCRIPTION OF THE PREFERRED EMBODIMENT

Figure 1A:
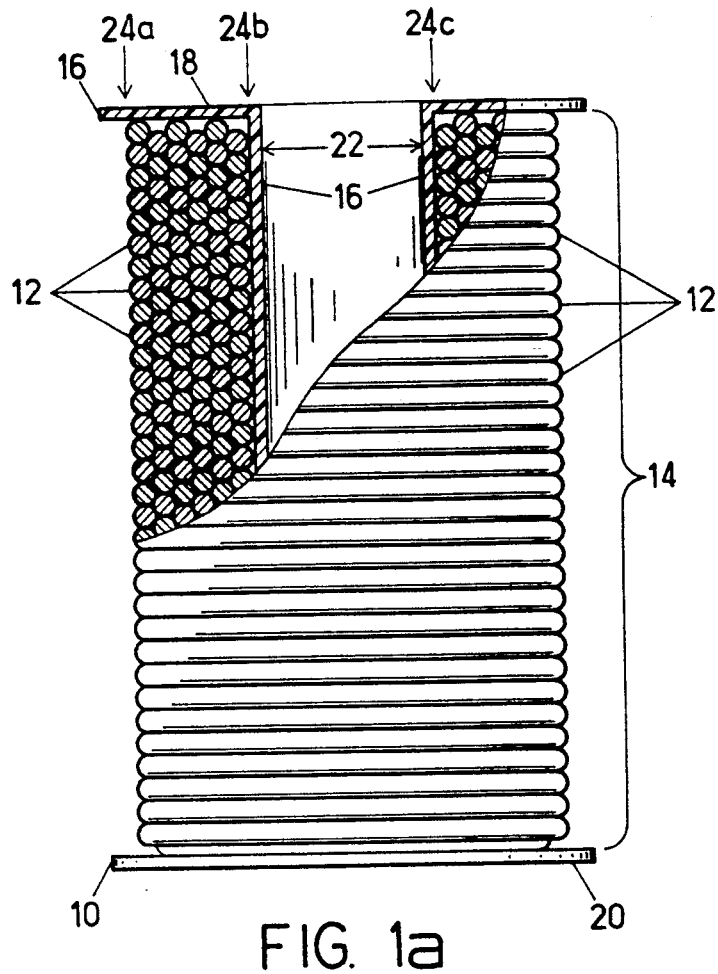
FIG. 1a is a partial cross-sectional view of a prior art coil, showing the use of a bobbin and ordinary circular wire.
Figure 1B:
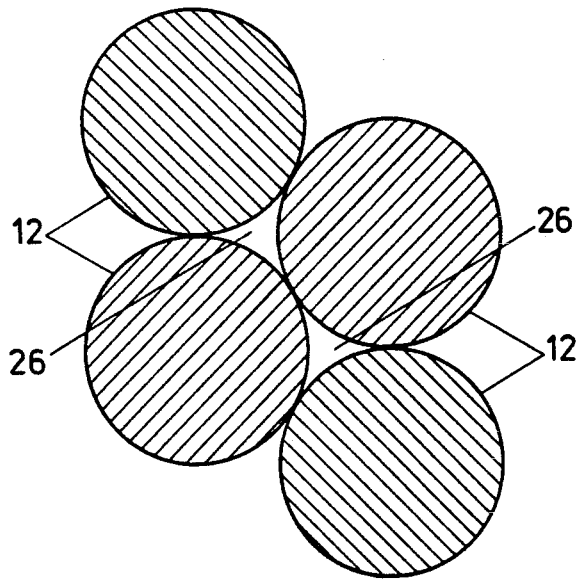

With reference to FIGS. 1a and 1b, labelled "Prior Art," a bobbin 10 is wound with a plurality of turns of circular wire 12 to form a coil 14. The bobbin 10 has a central sleeve portion 16, which is formed in the desired shape of the resulting coil, usually a cylinder, and two end plate portions 18 and 20, for retaining the coil 14 on the sleeve portion 16. The bobbin 10 often has a central longitudinal throughbore 22 for allowing the later insertion of an actuating element such as an armature, a solenoid shaft, or a permanent magnet, for example, which is not shown. Alternatively, the actuating element may be positioned near the outside perimeter of the bobbin, allowing the bobbin 10 to function without a throughbore. A power source, not shown, is connected to the two ends of the wire 12 in the coil 14 so that the coil can be energized with an electrical current. Dimensions of the bobbin 10 and the gauge of the wire 12 may be tailored to suit the application. The wire 12 has a very thin highly resistive coating, not shown, which prevents current leaks between adjacent turns of wire. Reference marks 24a-24c are shown in the figure for two reasons: first, marks 24a-24b indicate the thickness of the coil 14; second, marks 24b-24c indicate the inner diameter of the coil 14.

With respect to reference marks 24a-24b, it will be seen in this example that six layers of wire can be wound onto the bobbin 10 between the two reference marks. With 32 windings of wire in each layer, the bobbin 10 supports a total of 192 (6×32) turns of wire. With respect to reference marks 24b-24c, it will be seen that the inner diameter of the coil 14 is greater than the diameter of the throughbore 22. This is a disadvantage because it prevents any actuating elements inside the throughbore 22 from coming into close proximity to the coil 14.

FIG. 1b is an enlarged cross-sectional view of a few turns of the wire 12 in the prior art coil 14. It will be appreciated that the use of circular wire limits the density of the resulting coil due to gaps 26 which exist between the individual turns in the coil.

Figure 2A:
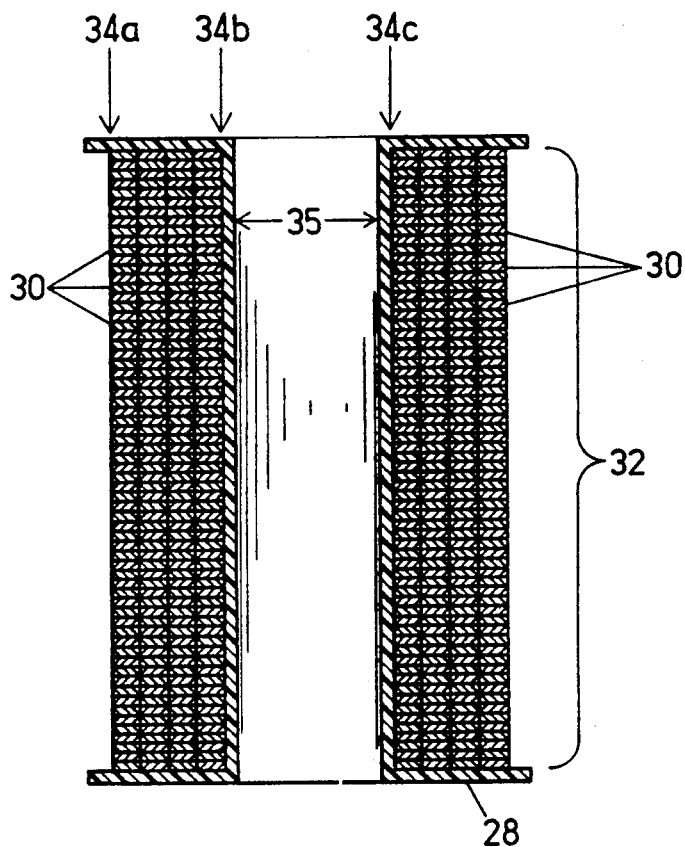
FIG. 2a is a cross-sectional view of another prior art coil, showing a coil wound on the bobbin of FIG. 1a using rectangular wire.
Figure 2B:
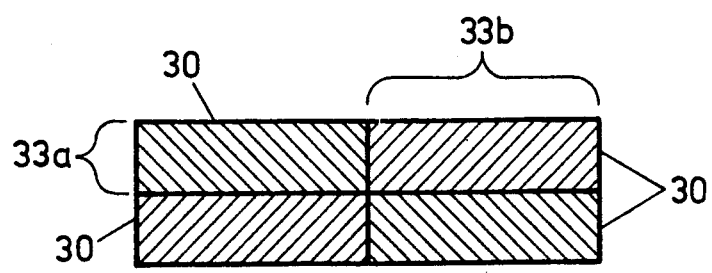

FIGS. 2a and 2b, also labelled "Prior Art", show a cross-sectional view of a coil which uses preformed rectangular wire. A bobbin 28 is wound with a plurality of turns of rectangular wire 30 to form a coil 32. Preformed rectangular wire 30 is readily available from wire manufacturers, such as MWS Wire Industries. In many applications, the rectangular wire 30 is wound in the manner shown in the figure, so that the shorter side 33a of the wire is parallel to the longitudinal axis of the coil 32 and the longer side 33b of the wire is parallel to the radial dimension of the coil 32.

An enlarged cross-sectional view of a few turns of the rectangular wire 30 is shown in FIG. 2b. For purposes of illustration, the bobbin 28 is assumed to have approximately the same dimensions as the bobbin 10 of FIG. 1a; reference marks 34a-34c are assumed to have approximately the same dimensions as the reference marks 24a-24c of FIG. 1a; and the wire 30 is assumed to have approximately the same dimensions as the wire 12 of FIG. 1a.

With respect to reference marks 34a-34b, it will be seen that now four layers of rectangular wire can be wound onto the bobbin 28 between the two reference marks. With 65 windings of wire in each layer, the bobbin 28 has a total of 260 (4×65) turns of wire. Thus, in this example, the bobbin 28 can support about 30 percent more turns of wire than it could support with ordinary circular wire 12. With respect to reference marks 34b-34c, however, it will be seen that the diameter of the throughbore 35 has not been reduced by the mere substitution of rectangular wire 30 for circular wire 12.

Figure 3A:
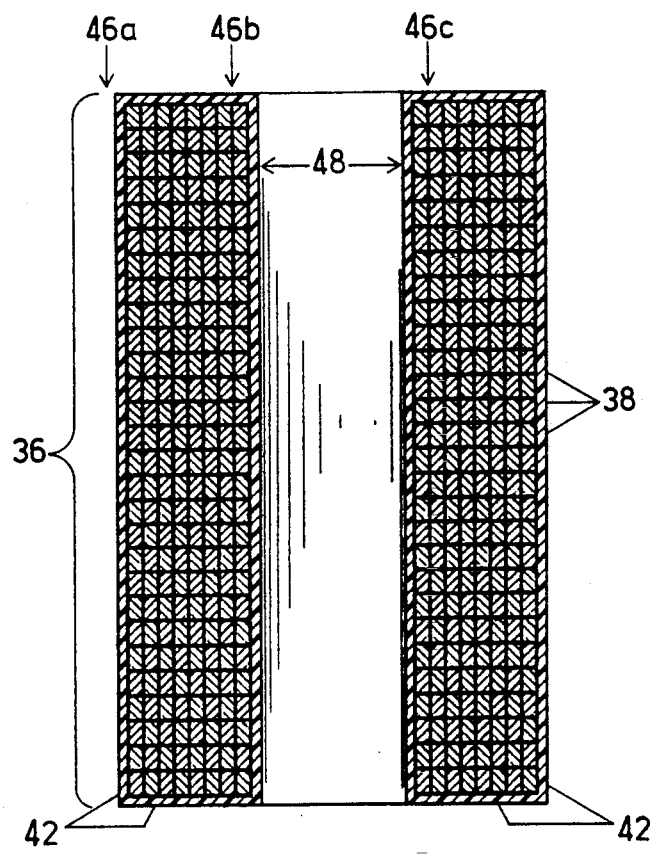
FIG. 3a is a cross-sectional view of a bobbinless coil in accordance with the preferred embodiment of the present invention.
Figure 4A:
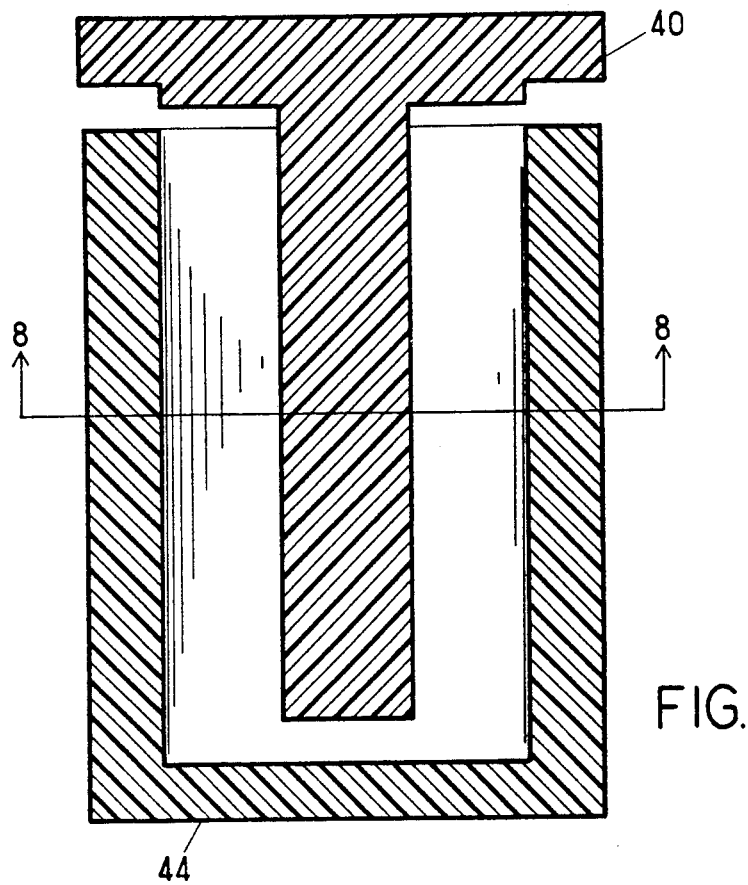
Figure 4B:
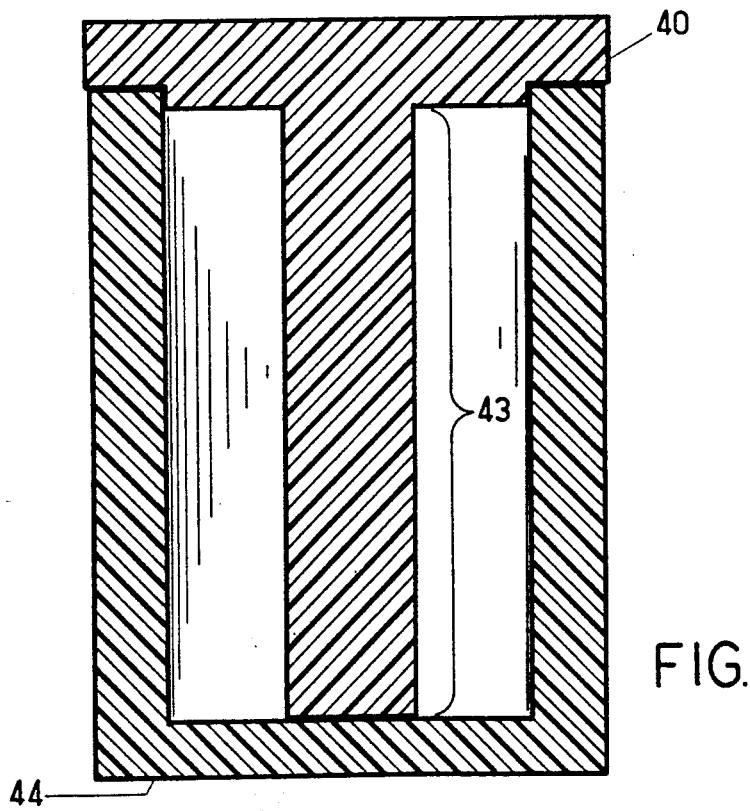

FIG. 3a shows a cross-sectional view of a bobbinless coil 36 in accordance with the preferred embodiment of the present invention. A plurality of turns of flattened wire 38 is wound around a shaft portion 43 of a mold 40, shown in FIG. 4b, to form the bobbinless coil 36. The bobbinless coil 36 is potted with a potting compound 42 so that the bobbinless coil 36 can be removed from the shaft portion of mold 40 when the potting compound 42 has hardened. In the preferred embodiment of the present invention the shaft portion 43 of mold 40 serves only as a mandrel for winding the bobbinless coil 36. The mold 40 has a cup-shaped cover 44, shown in FIGS. 4a and 4b, which may be used to contain the potting compound 42 in its unhardened state. In the preferred embodiment of the present invention, the mold 40 and cover 44 are formed of a hard thermoplastic material, such as styrene, which is easy to machine. The mold 40 and cover 44 may alternatively be made of other materials, such as metal, wood, ceramic, or other plastic. The mold 40 and cover 44 may also be coated with a release agent, not shown, to help prevent the potting compound 42 from adhering to the mold or to the cover. In an alternate embodiment the release agent may take the form of a thin material, such as paper, plastic film, or mylar, which is wrapped around the mold and which may become adhered to the surface of the bobbinless coil. However, since the purpose of this wrap is merely to prevent the finished coil from adhering to the mold, its function is not structural. It would therefore not need to possess the structural rigidity or thickness which might otherwise characterize a bobbin. If plastic is used for the mold 40 or cover 44, care should be taken to ensure that any solvents in the potting compound 42, or in the release agent, do not dissolve the plastic.

The potting compound 42 is preferably an epoxy type compound which is curable at room temperature. Such compounds, for example the Epocap 19284 compound supplied by Hardman, Inc., are commonly available. Substantially any compound suitable for potting of transformers, resistors, or other electrical components, may be advantageously used.

A wide variety of processes and materials may be used to produce the bobbinless coil 36. One technique is a wet winding technique wherein potting compound is applied to the wire 38, or the mold 40, during the winding process, and then is allowed to cure at room temperature or at an elevated temperature. Another way is to vacuum impregnate the bobbinless coil 36 after it is formed, by evacuating the air around and inside the coil and then back filling it with potting compound. Again, curing can be done at room temperature or at an elevated temperature. A third way is to wind the bobbinless coil 36 with wire that has a hot-melt material coating, which can then be heated up after the coil is made to activate the potting compound. A fourth way is to wind the bobbinless coil 36 so that it is self-supporting and may be removed from the mold 40, the bobbinless coil then being coated with the potting compound such as by dipping or spraying. Other techniques may also be used. The preferred technique is to apply the adhesive to the wire 38 as it is wound onto the mold 40.

A wide variety of processes and techniques may also be used to obtain flattened wire 38. One option is to use the preformed rectangular wire which is known to prior art. In the preferred embodiment of the present invention, the wire is not preformed. Instead, the wire is flattened on four sides using a roller die, an example being the roller die known to those in the art as a Turk's head. Other dies or rollers may be used instead of, or in addition to, the roller die. It is preferably to flatten the wire right before it is wound onto the mold 40 to avoid any possibility of wire twisting. If the wire is flattened right before it is wound onto the mold, the tensioning device may also serve as part of the tensioning device for the wire. The Turk's head works well for this purpose. Alternatively, the wire may be flattened without winding it onto a mold, and the coil can be wound at a later time. Other winding techniques may also be used. Alternatively it may be possible, but less preferred, to flatten the wire after it has been wound onto the mold.

A wide variety of conducting materials may be used for making the flattened wire 38. Although copper wire is used in the preferred embodiment and is useful for many applications, good results can also be obtained with wire made from copper alloys, aluminum or aluminum alloys, silver or silver alloys, gold or gold alloys, and wire which is clad with any of these materials. Other wire materials may also be used.

Figure 8:
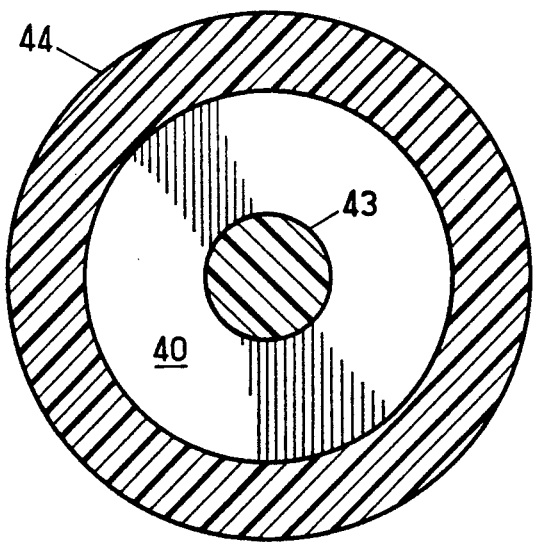

In the preferred embodiment of the present invention, the shaft portion 43 of mold 40 has a circular cross-section, illustrated in FIG. 8, in order to avoid the previously mentioned problems which may be encountered with rectangular bobbins. Use of the present invention, however, is not limited to circular cross-sections. A bobbinless coil with a rectangular cross-section could be wound with flattened wire and be potted with putting compound. In addition, it will be appreciated that the present invention may also be advantageously employed in circumstances wherein more than one wire is wound simultaneously onto the mold or wherein the coil includes a single coil having a plurality of points or "taps" for providing electrical connections to the coil at different places along its length. These types of coils, referred to as "multifilar" coils, provide multiple connections to the coil and may offer some desirable features when used for driving the moving mirror of an interferometer. For example, one part of the coil may be used for driving the moving mirror while another part is used as a sensor of position or velocity of the moving mirror.

Also shown in FIG. 3a are reference marks 46a-46c, which have about the same dimensions as the reference marks 34a-34c and 24a-24c. It can be seen that in addition to permitting a greater number of turns of wire to be included in the coil 36, as was the case for coil 32, the preferred embodiment of the present invention also allows a reduction in the diameter of the throughbore 48. By eliminating the bobbin 10, the innermost windings of the bobbinless coil 36 can be brought into closer proximity with an actuating element which may be inserted into the throughbore of the coil. In a similar manner, eliminating the bobbin 10 also eliminates the end plate portions 18 and 20, which exposes the ends of the bobbinless coil 36 and eliminates any interference which may be caused by the end plate portions extending radially beyond the periphery of the coil.

Figure 3B:
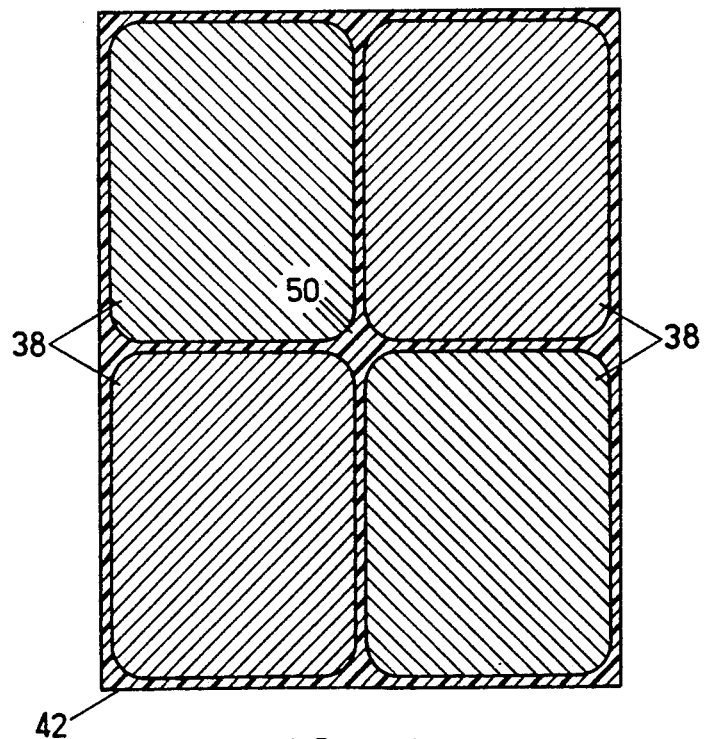

FIG. 3b is an enlarged cross-sectional view of a few of the turns of wire 38 in the bobbinless coil 36. The flattened wire 38 is preferably formed by flattening ordinary copper wire to an aspect ratio of about 1.5. Flattening copper wire any further will tend to produce work hardening and increased electrical resistance, which is undesirable. At a minimum the wire can be flattened to an aspect ratio of 1.0, which will make it square. The maximum aspect ratio of the wire 38 may be determined by the amount of flattening which the wire can experience before it shows a significant increase in its electrical resistance. As an upper limit, the flattened wire should not show any significant increases in its electrical resistance, a significant increase being one which detrimentally effects the operation of the coil. The exact measure of such an effect is largely subjective, of course, and will be determined by the particular application. For instance, the amount of Ohm heating which can be tolerated or the amount of energy the power supply can produce will provide some indication of how much electrical resistance can be tolerated in the wire 38. The upper limit will also depend on the material chosen for the wire; some materials will show resistance increases at a lower aspect ratio than others. Although the flattened wire 38 may have more rounded corners than the preformed rectangular wire of FIGS. 2a and 2b, it will be appreciated that the remaining gaps 50, indicated in FIG. 3b, are relatively small compared to the gaps 26 shown in FIG. 1b. Other noncircular cross-sectional shapes which give superior density of the coil may also be obtained by flattening ordinary wire. However, shapes other than the rectangle may require more complex equipment or processes to produce.

FIG. 3b also shows the potting compound 42 used in the preferred embodiment. It will be appreciated that the thickness of the potting compound has been exaggerated in the figure in order to illustrate its presence. The potting thickness will usually be negligible.

Figures 5A, 5B, 5C:
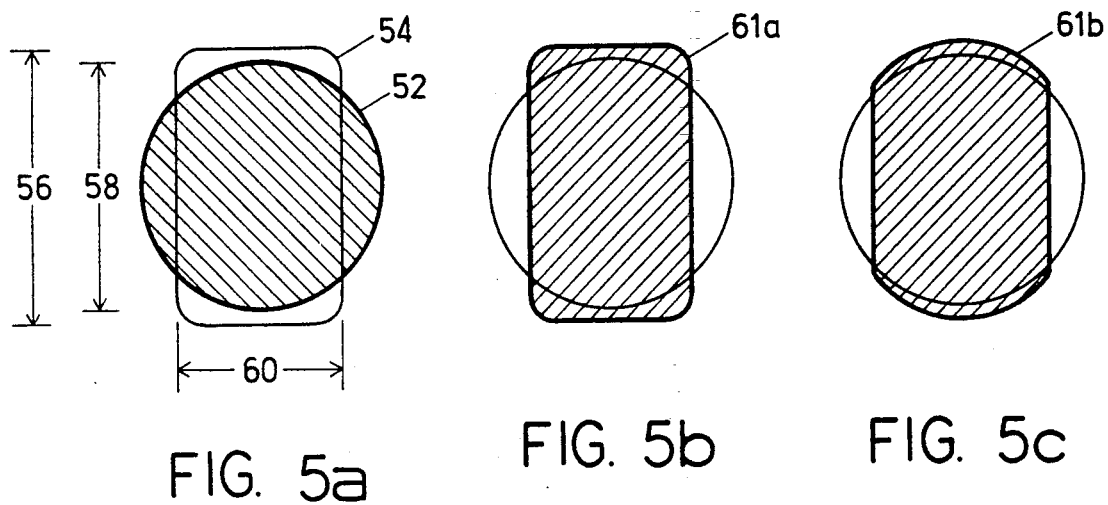
FIGS. 5a, 5b and 5c are enlarged cross-sectional views of sample wire before and after being flattening, showing the approximate dimensional changes which occur during the flattening process.

Examples of the dimensional changes experienced by ordinary wire when it is flattened are shown in FIGS. 5a, 5b and 5c. In FIG. 5a an ordinary circular wire 52 is shown in cross-section with an example outline 54 of a flattened wire. By flattening ordinary round copper wire to an aspect ratio of about 1.5, the flattened wire has about the same width 56 as the diameter 58 of the original wire, but the height 60 is about thirty percent less than the original wire diameter. The flattening action only pushes a small portion of the material around the top and bottom of the wire, over to the two sides to make up the four corners of the flattened wire, which is shown as 61a in FIG. 5b. If a Turk's head is used to flatten the wire, then all four of the rollers in the Turk's head can be used to flatten the wire. This results in the semi-rectangular wire with rounded corners that is shown in FIGS. 2a, 2b, 3a, 3b and 5b. Alternatively, as shown in FIG. 5c, two sides of the flattened wire can be left rounded, as shown by wire 61b. In the preferred embodiment of the present invention the original wire is 28 gauge copper wire which has a nominal diameter of about 0.0147 inches. This forms a flattened wire which has a width 56 of about 0.014 inches and a height 60 of about 0.009 inches.

Figure 6B:
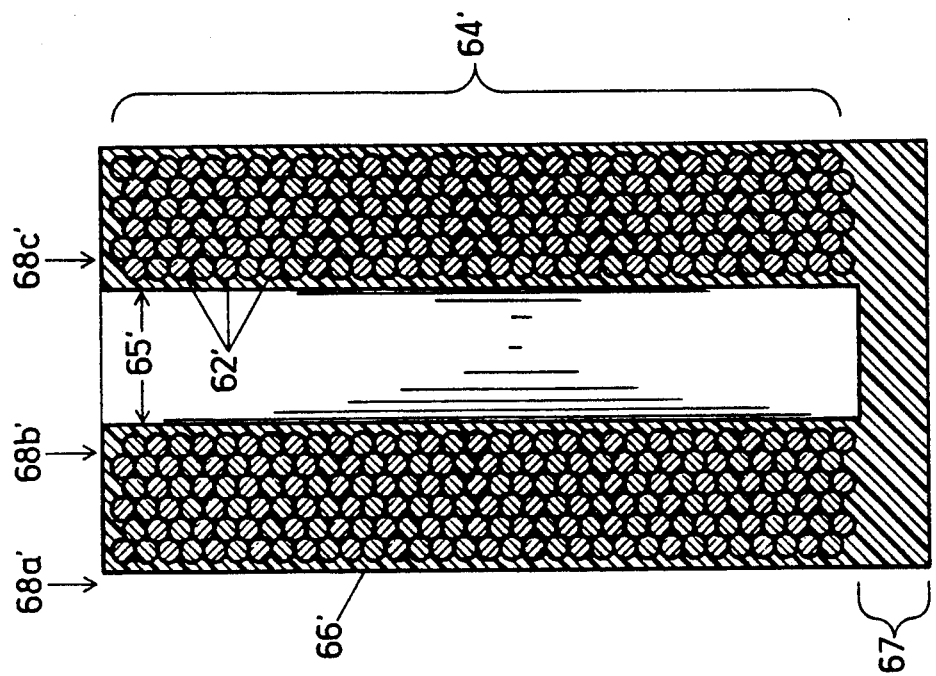
FIGS. 6a and 6b are cross-sectional views of bobbinless coils in accordance with alternate embodiments of the present invention.
Figure 6A:
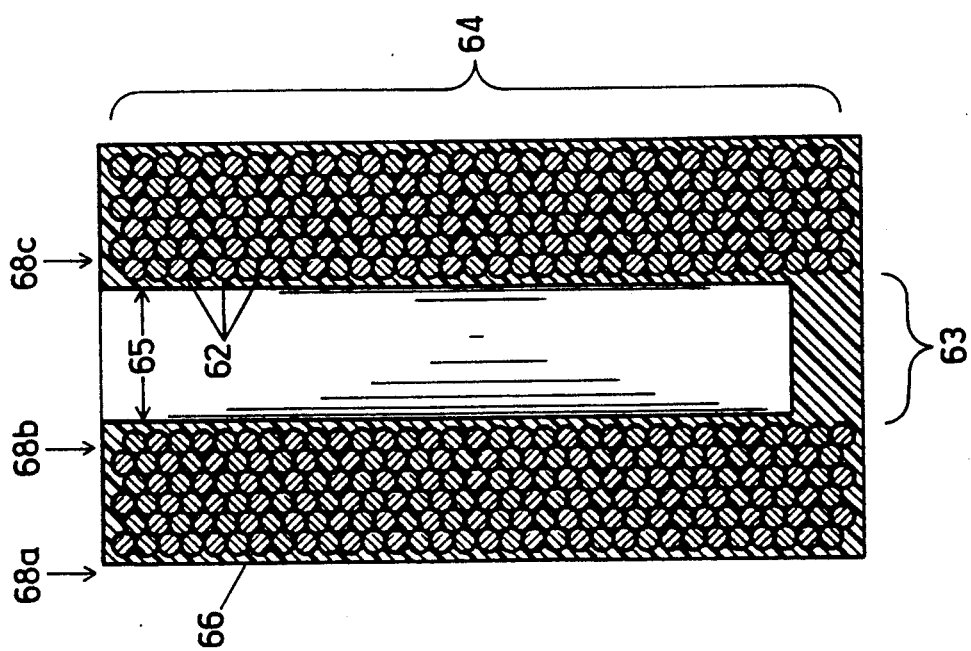

The potting technique is not limited to use with flattened wire. FIG. 6a is a cross-sectional view of another alternate embodiment of the present invention. In this embodiment ordinary circular wire 62 is used, instead of rectangular or flattened wire, to form bobbinless coil 64. The bobbinless coil is potted with potting compound 56. The same previously discussed techniques can be used to achieve the potting. Reference marks 68a-68c have about the same relative dimension as the previous reference marks 24a-24c. It will be seen that although the thickness between marks 68a-68b is about the same as the thickness between 24a-24b for the circular wire 12 on the bobbin 10, the diameter of the innermost turns of wire 65 has been reduced by eliminating the bobbin. Thus, even if circular wire is used to form the bobbinless coil, some spatial advantages are still available.

An additional feature shown in FIG. 6a is a plug portion 63 which may be added to the bobbinless coil 64. The plug portion 63 is preferably made of the same material as the potting compound 66. The purpose of the plug portion 63 is to provide a surface through which a fastener, such as a bolt, screw or rivet, can be used to attach the bobbinless coil 64 to a device. Alternatively, as shown in FIG. 6b, an end cap portion 67 may be used to serve the same purpose. Alternatively, as shown in FIG. 3a, the plug portion or end cap portion may be eliminated if the bobbinless coil 64 is, for example, adhesively bonded to the device. Other fastening or mounting techniques may also be used. In the preferred embodiment of the present invention, the flattened wire of FIG. 3a is used together with the end cap portion of FIG. 6b; the end cap portion being advantageously formed by shortening the shaft portion 43 of the mold 40, shown in FIG. 4b, so that a gap exist between the end of the shaft portion 43 and the cover 44 when the mold is fully inserted in the cover.

Figure 7:
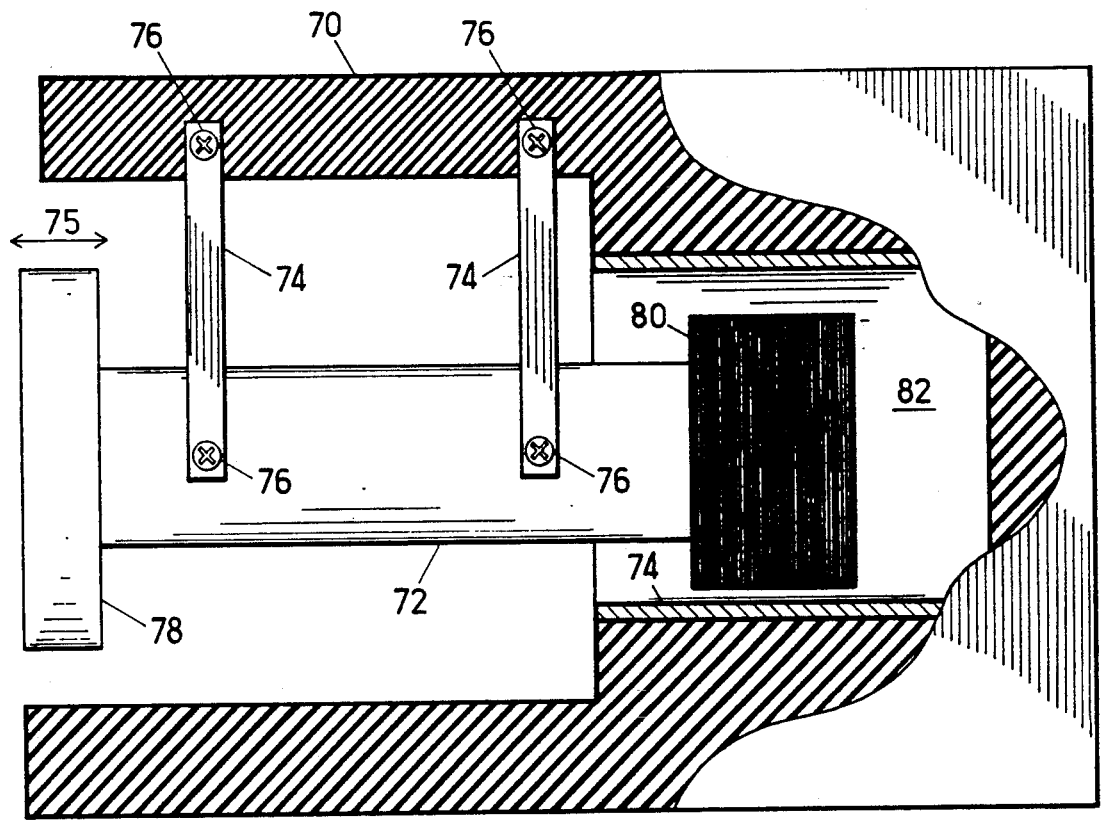
FIG. 7 is a partial cross-sectional view of the moving mirror portion of an interferometer spectrometer, illustrating the location of the bobbinless coil.

Lastly, FIG. 7 shows an example of the manner in which the bobbinless coil is used to form a linear motor in an interferometer. An interferometer housing 70 carries a mirror support element 72 via parallel support arms 74. The parallel support arms 74 are pivotally mounted at each end by bearings 76, which allow the mirror support element 72 to swing freely back and forth. A mirror 78 is attached to one end of the support element 72 and an electromagnetic coil 80 is attached to the other end. The support element 72 thus serves to operatively connect the coil 80 to the mirror 78, so that actuation of the coil will produce a desired scanning motion of the mirror. A moving mirror assembly is thus formed by the combination of the support element 72, the coil 80, and the mirror 78.

A bore 82 is provided in the interferometer housing 70 in the proximity of the coil 80, and actuating elements 84 are attached to the housing 70 within the bore 82. Passing an electrical current through the coil 80 causes an electromagnetic force between the coil 80 and the actuating elements 84, which in turn produces a longitudinal displacement 75 of the mirror support element 72. A detailed description of the operation of an interferometer can be found in the previously mentioned U.S. Pat. No. 4,693,603.

It is understood that the invention is not confined to the particular embodiments described herein as illustrative, but embraces such forms thereof as come within the scope of the following claims.

What is claimed is:

1. A moving mirror assembly for an interferometer, comprising:
    (a) an interferometer housing;
    (b) a support element;
    (c) a mirror, connected to the support element;
    (d) a bobbinless electromagnetic coil, connected to the support element, wherein the bobbinless electromagnetic coil is potted in a potting compound so that the coil is supported by the potting compound; and
    (e) means for connecting the support element to the interferometer housing to allow back and forth motion to provide back and forth scanning motion of the mirror as the coil is activated.

2. The device of claim 1, wherein the coil wire has a noncircular cross-section.

3. The device of claim 1, wherein the coil wire has two flat sides.

4. The device of claim 1, wherein the coil wire has four flat sides.

5. The device of claim 1, wherein the coil wire has a semi-rectangular cross-section.

6. A moving mirror assembly for an interferometer, comprising:
    (a) a support element;
    (b) a mirror, connected to the support element; and
    (c) a bobbinless electromagnetic coil, connected to the support element, wherein the bobbinless electromagnetic coil is potted in a potting compound, wherein the wire has a semi-rectangular cross-section having an aspect ratio of about 1.5.

7. A method of producing a moving mirror assembly for an interferometer, comprising the steps of:
    (a) coating a wire with a potting compound;
    (b) winding the wire onto a mold;
    (c) hardening the potting compound;
    (d) removing the coil from the mold; and
    (e) connecting the coil to a support element of the moving mirror assembly.

8. The method of claim 7, wherein said winding step includes the step of altering the wire to a noncircular cross-section.

9. The method of claim 7, wherein said winding step includes the step of flattening the wire to produce two flat sides.

10. The method of claim 7, wherein said winding step includes the step of flattening the wire to produce four flat sides.

11. The method of claim 7, wherein said winding step includes a step of flattening the wire to produce a semi-rectangular cross-section.

12. The method of claim 7, wherein said winding step includes the step of winding preformed noncircular wire onto the mold.

13. The method of claim 7, wherein coating step includes the step of coating the wire with an epoxy adhesive.

14. A method of producing a moving mirror assembly for an interferometer, comprising the steps of:
    (a) coating a wire with a potting compound;
    (b) winding the wire onto a mold, wherein said winding step includes the step of flattening the wire to produce a semi-rectangular cross-section having an aspect ratio of about 1.5;
    (c) hardening the potting compound;
    (d) removing the coil from the mold; and
    (e) connecting the coil to a support element of the moving mirror assembly.

* * * * *